(No Model.) 4 Sheets—Sheet 1.
F. H. RICHARDS.
AUTOMATIC WEIGHING MACHINE.
No. 559,746. Patented May 5, 1896.
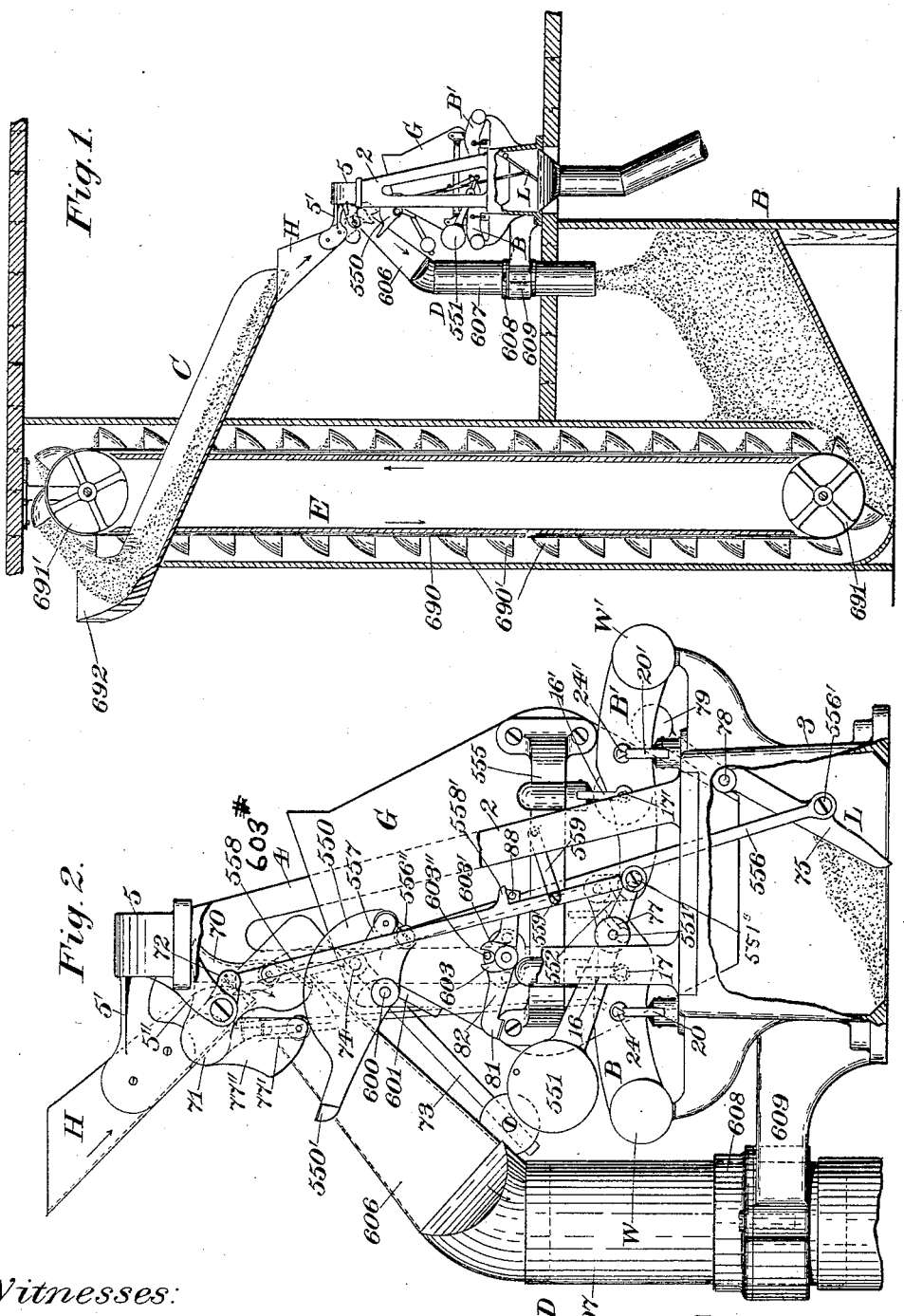
Witnesses:
J. L. Edwards Jr.
Fred. J. Dole.
Inventor:
F. H. Richards

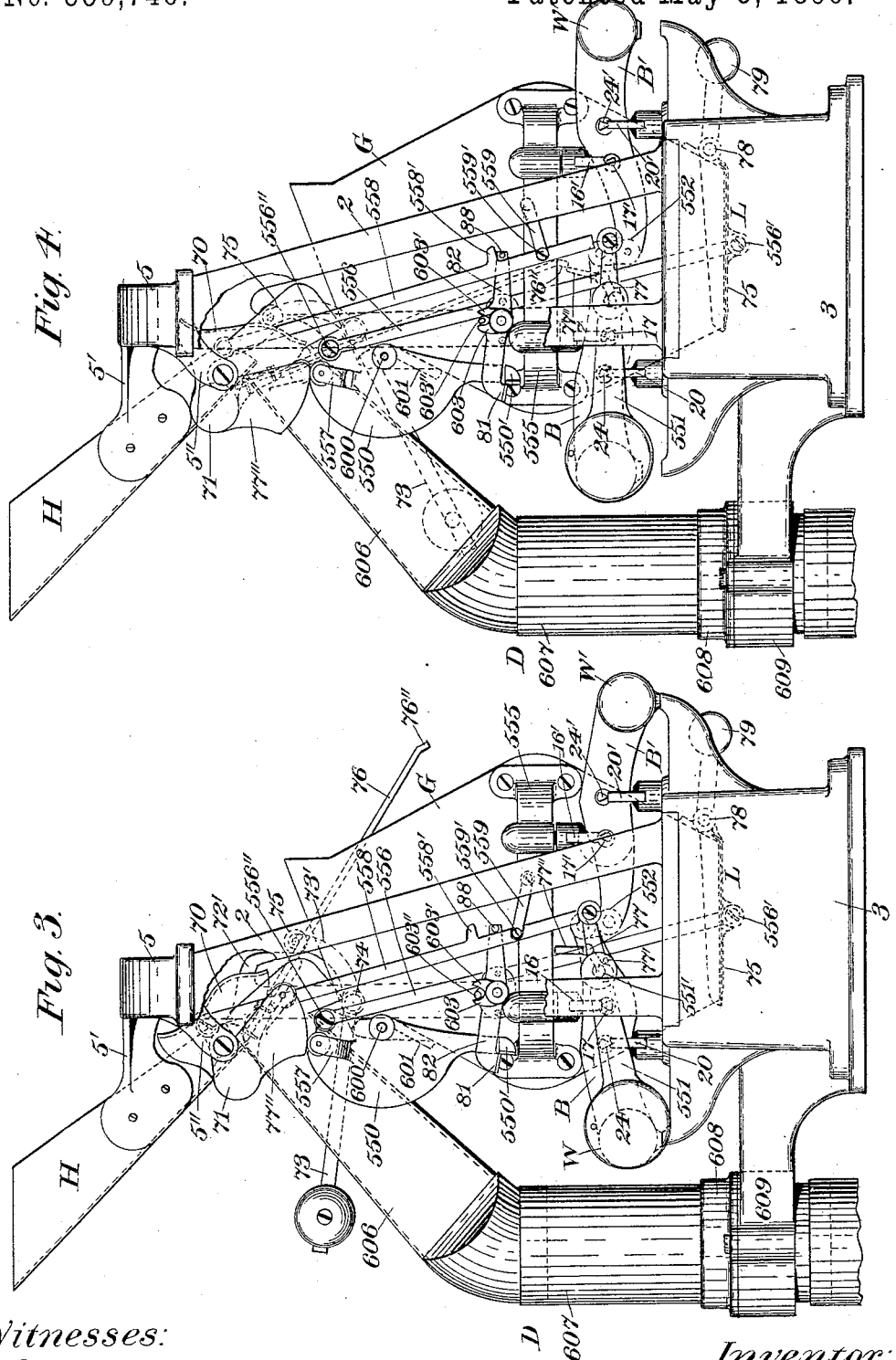

(No Model.)  F. H. RICHARDS.  4 Sheets—Sheet 3.
AUTOMATIC WEIGHING MACHINE.
No. 559,746.  Patented May 5, 1896.

Witnesses:
L. L. Edwards Jr.
Fred. J. Dole.

Inventor
F. H. Richards (No Model.)  4 Sheets—Sheet 4.

F. H. RICHARDS.
AUTOMATIC WEIGHING MACHINE.

No. 559,746. Patented May 5, 1896.

Witnesses:
J. L. Edwards Jr.
Fred. J. Dole.

Inventor:
F. H. Richards.

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 559,746, dated May 5, 1896.

Application filed April 8, 1895. Serial No. 544,864. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing apparatuses, the object being to provide an effective organization of coöperating mechanisms and devices peculiarly adapted for maintaining a constant supply of material to the bucket of a weighing machine or mechanism, the organization of apparatus being particularly adapted for weighing materials of irregular consistency, and to provide operable stream-controlling means in the path of the supply-stream for alternately at predetermined periods permitting a flow of the supply-stream to the bucket of a weighing-machine and diverting it away from said bucket.

Figure 5:
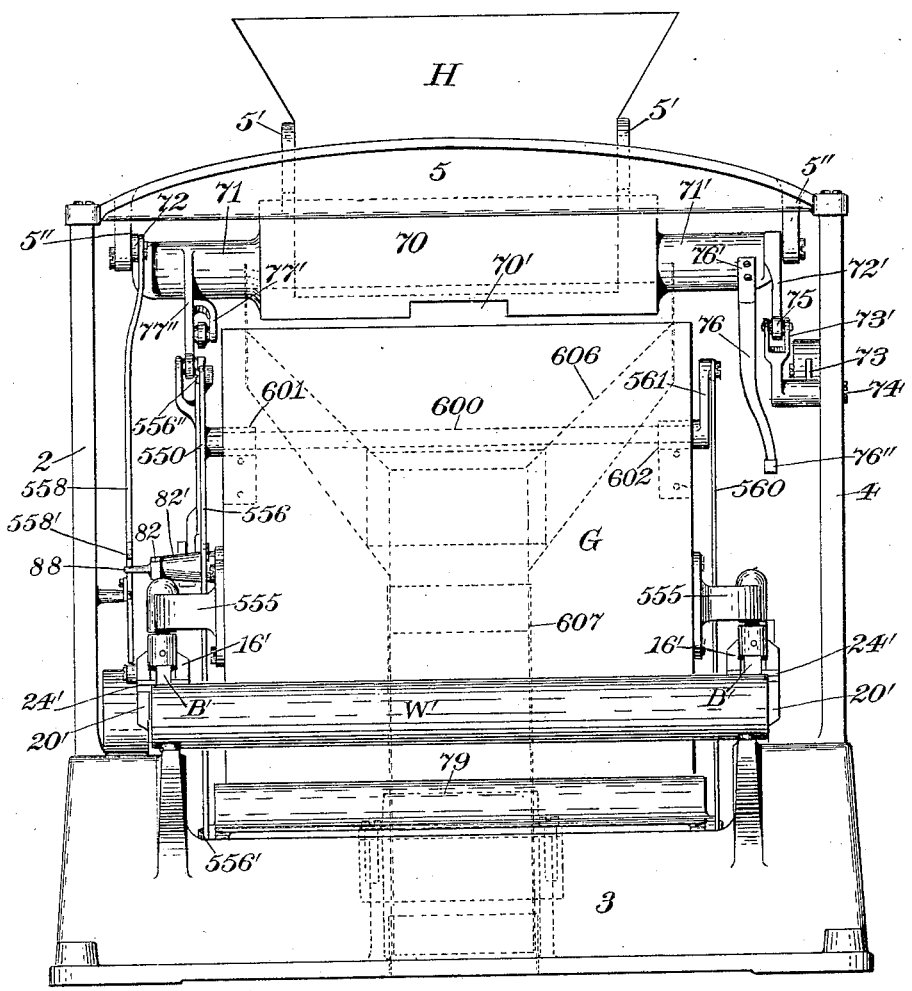
Figure 6:
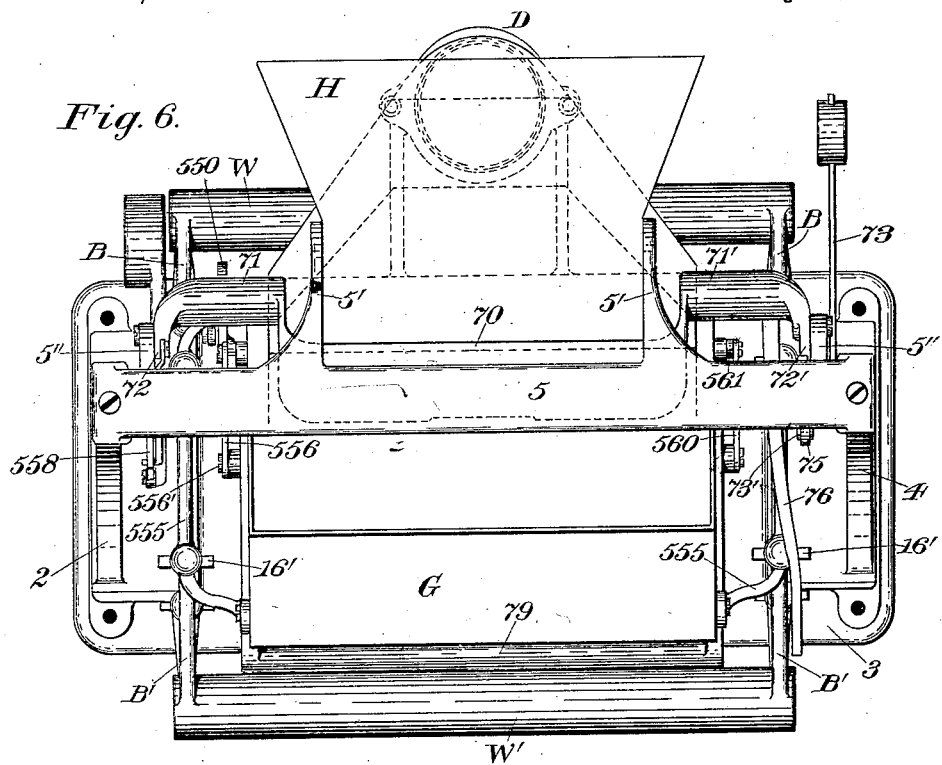
Figure 7:
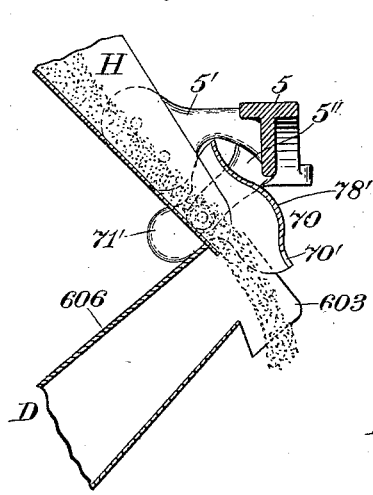
Figure 8:
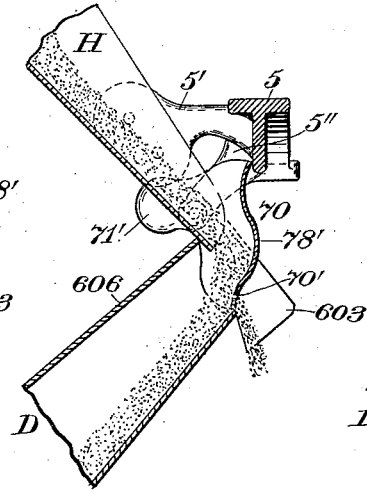
Figure 9:
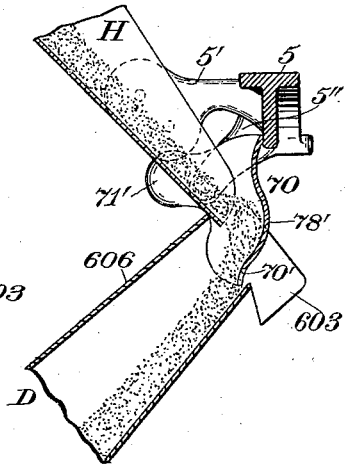

In the drawings accompanying and forming part of this specification, Figure 1 is an elevation, partially in section, of a weighing apparatus embodying my present improvements, this view illustrating a convenient means for conveying the supply-stream in the form of a circuit and showing a weighing machine or mechanism adjacent to said circuit for receiving a portion of the material from said supply-stream, the weighing-machine being shown on a relatively small scale. Fig. 2 is an end elevation of a weighing-machine, showing a stream-controller in position to divert the supply-stream from the bucket. Fig. 3 is a similar view showing the stream-controller permitting a flow of the material to the bucket. Fig. 4 is a view similar to Figs. 2 and 3, showing the stream-controller as having nearly diverted the supply-stream from the bucket, but permitting the flow of a relatively small or drip stream to make a complete load. Fig. 5 is a front elevation of a weighing-machine, and Fig. 6 a plan of the same. Figs. 7, 8, and 9 are details in cross-sectional side elevation showing, respectively, the positions assumed by the stream-controller when permitting a flow of the supply-stream to the bucket of a weighing-machine in its drip position and in a position diverting said supply-stream from the bucket.

Similar characters designate like parts in all the figures of the drawings.

My present improvements embody a weighing apparatus consisting in a general way of a suitable stream-supplying apparatus adapted for normally supplying a continuous stream of material, substantially in circuit form, to the bucket of a weighing mechanism and a stream-controller located at a suitable point adjacent to or in the path of the supply-stream and relatively adjacent to the weighing mechanism and adapted for diverting the supply-stream from the bucket on the completion of its load and for releasing the stream at the proper period to cause it to enter the bucket.

The present improvements are herein shown in connection with a weighing machine or mechanism substantially similar in all material respects to that described and claimed in my Patent No. 548,839, granted October 29, 1895; but it will be obvious that these improvements are adaptable to other forms of weighing machines or mechanisms.

The framework for carrying the operative parts of the weighing-machine may be of any suitable construction, and it is shown in the drawings comprising side frames 2 and 4, mounted upon the chambered base 3 and connected by a top plate 5 to the rearwardly-extending arms 5', to which is secured an inclined chute H, which constitutes a part of the conductor apparatus.

The base 3 is shown provided with bearings, in which are fixed suitable beam-supports or V-shaped bearings 20 and 20' for supporting the pivots or knife-edges 24 and 24' of the scale-beams.

The bucket G is pivotally supported on the oppositely-disposed counterweighted beams, (shown at B and B', respectively,) the bucket being shown provided with brackets or hangers 555, having the V-shaped bearings 16 and 16' resting on the pivots or knife-edges 17 and 17' of the scale-beams. This bucket G is so supported that its upper opening may receive the stream of material from the supply-chute of the conductor apparatus.

Each of the scale-beams B and B' is shown comprising a pair of beam-arms joined by a combined connecting-shaft and counterpoise, the counterpoise for the beam B being designated by W and that for the beam B' being designated by W'. Suitable means for maintaining the movements of the scale-beams in unison and hence the beam-arms in unison are provided. I have shown such means comprising a guide connection between and joining the beams and preferably comprising one or more connecting-links 552.

The bucket, which is of the "single-chambered" type or class, is shown having a relatively wide central portion and relatively narrow receiving and discharging openings and as substantially symmetrical at opposite sides of a central horizontal plane passing therethrough, so that the major portion of the load flowing thereinto will be sustained adjacent to and below said horizontal plane of the bucket to thereby lower the center of gravity of the bucket when loaded to its normal capacity. The bucket should be so constructed as to have no tendency to preponderate either in the one direction or the other.

The bucket-closer, which is designated in a general way by L, is shown consisting of a suitably-formed plate, such as 75, having a counterweighted arm 79, and is shown pivoted at 78 to the lower side of the bucket.

The means for supporting the bucket-closer comprise a rocker, (shown secured to a rock-shaft journaled in bearings on the bucket,) a latch for coöperating with the rocker for maintaining or locking it in one position, and an actuating-rod for releasing the engagement of the latch with the rocker. A rocker is shown at 550 suitably secured to the rock-shaft 600, which latter is shown journaled in bearings 601 and 602, formed on or secured to the rear upper portion of the bucket. A connecting-rod is shown at 556 pivoted to the closer at 556'. The opposite end of this connecting-rod is shown pivoted to the rocker, the pivot being shown at 556". A rocker-tripping latch is shown at 82 supported to have a limited oscillatory motion. The latch 82 is shown pivotally secured to the lateral arm 82', extending from the bucket and suitably secured thereto. The latch 82 is shown provided with a detent 81, engaging a corresponding coöperating detent on the rocker, said rocker-detent being shown at 550'. When the two detents just mentioned are in engagement, the closer is in its closed position, and it is obvious that upon their disengagement the weight of the material resting on the closer will open the closer.

A stop is shown at 88 and in position and adapted at a predetermined period to be engaged by a suitable device on the descent of the bucket for the purpose of tripping the latch 82 to thereby open the closer through its connection with the rocker. For the purpose of limiting the rocker or oscillatory motion of the latch 82 and to maintain it in its operative position it is shown provided with two stop-arms 603 and 603', with a suitable stop 603" on a fixed part of the bucket, as the arm 82', interposed between the stop-arms 603 and 603'. It will be obvious that at one period (or the tripping period) of the oscillation of the latch 82 the stop 603" will be engaged by the stop-arm 603, and on the opposite oscillation the stop 603" will be likewise engaged by the stop-arm 603' to lock the parts.

The material is supplied to the bucket in a continuous stream, substantially in a circuit, the continuity of which is only broken and at intervals by suitable means to direct a portion of the stream of material to the bucket and on the completion of the bucket-load diverting the stream from said bucket for returning it to the circuit. The material is kept constanly in motion, and the result is a disintegration and separation of the granules composing the mass of material to be weighed, the elevator apparatus assisting to break up lumps, &c., at the bin, this result rendering the present improvements peculiarly efficacious in weighing materials of a closely-adhering nature or of irregular consistency.

The means shown for maintaining the material in motion and in a circuit comprise a bin or other receptacle and a suitable elevator apparatus for elevating the material from said bin to an inclined chute or way, which latter supplies the material to a suitable conductor apparatus, (shown consisting of supply and discharge chutes H and D.)

Referring now to Fig. 1, a bin or other receptacle is shown at B for containing the material, which bin or receptacle is shown with an inclined floor or bottom to better adapt it for directing the material to an elevator apparatus. The elevator apparatus is shown at E, which disintegrates and separates the mass and elevates the material to an inclined chute or way (designated by C) in relatively small quantities. The elevator apparatus shown herein comprises the endless belt 690, provided with a bucket 690', the endless belt being shown passed over the usual pulleys 691 and 691', secured to shafts journaled in bearings suitably supported. Either one of said shafts may be the power-shaft.

I do not limit myself to the particular elevating mechanism shown in Fig. 1, but consider it within the province of my invention to employ any suitable mechanism for elevating the material—such, for example, as pneumatic or other carriers.

An inclined chute is shown at C, its receiving end 692 being in position and adapted for receiving the material as it is discharged by the buckets 690', the inclined chute conducting the material to the conductor apparatus. The conductor apparatus (shown relatively adjacent to the weighing mechanism, as hereinbefore stated) comprises suitable supply and discharge chutes, which are designated, respectively, H and D. The function of the conductor apparatus is to assist in controlling the stream to and from the bucket and in maintaining the material in its circuit form, supplying the bucket with material and providing means for the diversion of the stream on the completion of a bucket-load to its original source of supply.

The supply-chute H is so positioned that when the stream-controller is in one position (see Fig. 7) the material is permitted to enter the bucket, and when said stream-controller is in another position (see Fig. 9) the material may be diverted from the bucket and conducted down the discharge-chute D.

The top plate or beam is shown provided with rearwardly-extending arms 5', to which is secured the inclined supply-chute H. Said inclined supply-chute H is in position and adapted to receive the material from the inclined chute C, and is so positioned with respect to the bucket that when the stream-controller is in the position shown in Figs. 3 and 7 the whole stream is permitted to flow into the bucket.

The stream-controller proper is shown at 70, and consists of a suitable valve or deflector-plate in position and adapted for having a working stroke operable on the descent of the bucket to divert the supply-stream from the bucket or to return it to the circuit. The stream-controller is shown interposable in the path of the supply-stream and is intermittently operable to cause the stream to flow to the bucket and to divert the same gradually therefrom or return it to the circuit when the bucket has made up its complete load. The stream-controller 70 is shown provided with pivot-arms 71 and 71', which are adapted to receive the pivot-screws shown seated in the arms or brackets 5'', depending from the top plate or beam 5. From this it will be understood that the stream-controller is supported independently of the weighing mechanism and that as said stream-controller is actuated for diverting the supply-stream away from the bucket this action cannot in any manner affect the accuracy of the machine as a weighing factor. The stream-controller is shown disposed with its movements substantially in a vertical plane, and it will be obvious, in view of this peculiar disposition, that the mass of material or supply-stream is not supported by the stream-controller when the stream has been diverted from said bucket, which consequently requires but a minimum expenditure of power to operate said stream-controller and renders it more certain and efficient in operation.

On reference to Fig. 3 of the drawings, wherein the stream-controller 70 is shown in a position for permitting the stream to enter the bucket, it will be observed that when the stream-controller is in such position the whole of the stream may enter the bucket, said stream-controller during this period being normally out of the path of said stream. On reference to Fig. 2, wherein the stream-controller is shown diverting the stream away from the bucket, it will be observed that the lower edge of the stream-controller projects a relatively small distance into the conduit, just far enough to effectively divert the stream away from the bucket and for preventing a waste of the material at this point. It will be further observed that the stream-controller, when in the position shown in Fig. 2, is relatively remote from the opposite wall of the conduit, which does not reduce the size of the opening of the conduit, by reason of which the whole of the stream may be directed into the conduit without affecting or reducing its volume.

It will be observed on reference to the sectional views Figs. 7, 8, and 9, which clearly show the operation of the stream-controller, that as said stream-controller is actuated for diverting the stream away from the bucket it substantially follows the flow of the supply-stream—that is to say, the arc of movement of the said stream-controller follows or is substantially coincident with the line of flow of the supply-stream, so that said stream is gradually diverted away from the bucket. By reason of this action of the stream-controller spattering of the material at the point where said stream is diverted away from the bucket is positively prevented. It will be observed also that the stream-controller is illustrated as located relatively adjacent to the discharge edge of the supply-chute H. This is important, as the stream-controller coacts entirely with said supply-chute, thereby securing a variable discharge opening or mouth for the chute. By reason of the location of the stream-controller relatively adjacent to the discharge edge of the supply-chute said stream-controller is adapted at all times to perfectly control the supply-stream.

On reference to Fig. 8 the stream-controller is shown as having diverted the supply-stream away from the bucket. It will be obvious that as the stream-controller is actuated for permitting the flow of the supply-stream to the bucket this action will positively loosen and break up the mass at the discharge edge of the supply-chute, and thereby agitate the material farther up in said chute, so that the blocking and clogging of the mass at the mouth of the chute are absolutely prevented. I prefer to locate the valve-axis relatively adjacent to the lines of flow of the supply-stream at the point where said stream is diverted away from the bucket. The said axis is illustrated as passing between the lines of flow of the supply-stream at the stream-diverting point, and it will be apparent that by reason of this location but a slight exertion of power will be necessary to secure a perfect control of the supply-stream at all times by means of said stream-controller.

Means are provided for actuating the stream-controller, as the bucket descends for discharging its load, to divert the supply-stream away from the bucket and on the ascent of the bucket for receiving a load for actuating said stream-controller to permit the supply-stream to flow into the bucket.

The valve or stream-controller is shown having on its pivot-arm 71 a forwardly-extending relatively short actuating-arm 72, to which is pivoted the stream-controller actuating or thrust rod 558, the opposite end of this rod 558 normally resting on the friction-roller 551'', which is shown pivoted to the counterweighted actuating-lever 551, shown forming part of the main counterweight and pivoted thereto at 551'.

Referring now to Fig. 2, wherein the bucket is shown as just having discharged a load of material, the valve or stream-controller is shown in a position to divert the supply-stream from the bucket. On the ascent of the bucket to receive another supply of material the stream-controller actuating or thrust rod 558 is engaged by the counterweighted actuating-lever 551, which latter exerts sufficient power to open the stream-controller, when the bucket has assumed its normal supply-stream-receiving position, to permit a flow of the stream to the bucket.

The stream-controller actuating or thrust rod 558 is shown provided with a latch-actuating part 558', disposed in the path of the stop 88 on the rocker tripping-latch 82.

On the descent of the bucket the stop 88 of the rocker tripping-latch 82 is engaged by the latch-actuator 558', formed on the actuating-lever 558, the latter being pivotally carried by the stream-controller, said latch-actuator 558' being adapted to trip said latch and disengage its detent from that of the coöperating detent 550' of the rocker 550 to permit an opening of the closer. To maintain the actuating-lever 558 in an operative position, it is shown provided with a link or other guide connection 559, pivotally secured at 559' to said rod, the opposite end of the link 559 being pivoted to a stud formed on a fixed part of the framework.

Means are employed for actuating or working the stream-controller to divert the stream away from the bucket, which means are shown comprising an actuating cam-arm depending from the arm 71' of the stream-controller and coöperating with a counterweighted actuating-lever. An actuating cam-arm is shown at 72', and the cam-arm-actuating lever is also shown at 73, pivoted at 74, to the side frame 4. The lever 73 is shown provided with a forwardly-extending curved bifurcated arm 73', in the bifurcation of which is journaled a friction-roller 75, which bears against the cam-face of the cam 72, and tends to normally exert a sufficient pressure against said cam-face to actuate or work the stream-controller to divert the stream away from the bucket.

The stream-controller 70 is shown provided with a relatively small drip-opening 70', which should be of such a size that when the stream-controller has diverted the main supply-stream from the bucket a relatively small or drip stream may continue to flow through said drip-opening.

Means are provided for maintaining or locking the parts in a drip position, so that the bucket is enabled to make up a complete and accurate load.

A stop-arm is shown at 76 secured to the pivot-arm 71' of the stream-controller 70. This stop-arm is shown provided with a detent disposed in the path of a coöperating pawl or detent. (Shown on the scale-beam B.)

A counterweighted pawl or detent is shown at 77 pivoted to the scale-beam B, and, as just stated, is in the path of the detent 76'' of the stop-arm 76. To maintain the pawl 77 in a position where it may at the proper period be engaged by the detent of the drip-locking lever, the beam is shown provided with a stop 77', on which the pawl 77 is adapted to rest.

In connection with the stream-controller and with the bucket-closer I employ a pair of coacting stops, one operative with the stream-controller and the other operative with the closer and in position and adapted each for serving as a stop device for the other.

Means are provided for retarding or controlling relatively the stream-diverting motion of the valve or stream-controller 70 sufficiently to complete the load in the bucket, such means comprising a stream-controller stop or cam-arm, the cam-face of which rides over a friction-wheel on the rocker during the descending motion of the bucket, and when this movement is nearly completed a friction-roller on the cam-arm engages the rocker, thereby coöperating with the drip-locking lever to maintain the bucket in a position to receive the drip-stream for making up a complete load. The bucket-closer stop or rocker 550 is shown provided with a bracket 557, in which and in the rocker is journaled a friction-wheel. A cam-arm is shown at 77'', depending from the pivot-arm 71 of the stream-controller 70. This cam-arm is shown provided with a bracket 77', in which is journaled a friction-wheel. As the bucket descends the cam-face of the cam-arm 77'' rides over the friction-wheel of the rocker, thereby controlling the working of the stream-controller and preventing a too sudden diversion of the stream by the stream-controller and its actuating mechanism. When the parts are in the position shown in Fig. 4, (which is the drip position,) the cam-face, it will be noticed, has nearly passed beyond the friction-roller of the rocker 550, and it will be observed that the friction-roller of the cam-arm 77'' is in engagement with the rocker. On the further descent of the bucket the rocker is carried entirely out of the path of movement of the cam-arm 77'', at which time the controller-actuating mechanism operates to actuate the controller to divert the whole of the supply-stream from the bucket, and just following this operation the latch-actuating part 558 engages the tripping-latch stop to disengage the rocker and latch-stops, thereby opening the closer to discharge the load in the bucket.

As hereinbefore stated, the conductor apparatus (shown in the drawings) comprises suitable supply and discharge chutes H and D. The discharge-chute D is shown consisting of a relatively large conduit 606, into which the material, when diverted from the bucket on the completion of its load, is conveyed to the pipe or tubular portion 607 and to its original source of supply, which is shown in Fig. 1 as a bin or other receptacle B. The receiving opening or mouth of the conduit 606 is shown relatively wide and in close proximity to the upper rear edge of the bucket and just below the discharge end of the supply-chute. For holding the discharge-chute D in place the pipe or tubular portion thereof is shown provided with a circumferential flange or collar 608, resting on and secured to the rearwardly-extending base-plate or frame 609, formed on the base 3 of the machine.

As the supply-stream issues from the supply-chute H and descends in an inclined direction into the bucket the upper side of said stream will of course strike the lower edge of the valve or stream-controller 70 when this has been actuated to divert the stream from said bucket and tend in some degree to scatter the material. For the purpose of preventing this action the valve or stream-controller is shown formed with a curved or inclined portion 78, (see Figs. 7, 8, and 9,) which gradually comes into contact with the supply-stream, so as to divert said stream by a pressure upon one side of the stream and without tending to seize hold of and thereby suddenly deflect the upper portion of the moving stream. On the gradual diversion of the supply-stream said stream assumes the form of an arc, (see Fig. 9,) which coincides with the curvature of the valve or stream-controller and which offers a relatively small resistance to the stream. By the peculiar construction of the stream-controller just described the stream is gradually diverted from the bucket as it descends; but this is not wholly diverted from the bucket until the main stream has nearly filled the bucket to the requisite predetermined capacity and the drip-stream permitted to flow therein to make up a complete load.

The conductor apparatus, as hereinbefore stated, is shown comprising suitable supply and discharge chutes, the discharge-chute in turn being shown composed of a relatively wide conduit portion and a relatively large tubular or pipe portion suitably connected. On the completion of a load the stream is diverted to the conduit of a discharge-chute by the stream-controller. This conduit is shown disposed with its receiving end or mouth relatively adjacent to the weighing mechanism and under the discharge end of the supply-chute. On reference to the drawings it will be observed that the conduit of the discharge-chute is shown disposed substantially at a right angle or relatively transversely to the supply-chute; and it will be apparent that the line or course of the stream when it is diverted from the bucket and when it enters the discharge-chute is relatively transverse to the line of the stream when flowing into the bucket. When the stream-controller is in a position to permit the stream to enter the bucket, owing to the peculiar disposition of the conduit, the stream cannot enter said conduit, the impetus or velocity of the stream being sufficient to carry it past the mouth of the conduit. To assist in insuring the full stream entering the bucket when the latter is in its normal stream-receiving position the receiving-opening of the bucket is disposed so that it may receive the full stream. By the peculiar coöperative disposition of the supply-chute and the discharge-chute it is obvious that the arc of movement of the stream-controller is relatively slight and it is necessary for the said stream-controller to travel but a relatively short distance to effectively divert the stream from the bucket and to the conduit of the discharge-chute.

It will be observed that the supply-chute is of relatively less width than the length of the stream-controller 70, and that the discharge-chute D is of relatively greater width than the length of the stream-controller. The supply-stream when it enters the bucket G from the supply-chute H naturally has an accelerated speed by reason of its obstructionless travel over the inclined chutes C and H, and if any tendency of the material to scatter or spray at the sides exists waste of the material is prevented by making the supply-chute relatively smaller than the bucket and conduit portion of the discharge-chute.

To further assist in preventing scattering or spraying and waste of the material after it leaves the inclined chute H, the relatively large conduit of the discharge-chute D is shown provided with scatter-guards 603# at each side thereof. Should relatively small separated portions strike these scatter-guards, such portions of course will be directed into the bucket, which is of relatively greater width than the supply-chute.

The supply-stream after it leaves the inclined chute is free of all obstruction save relatively small frictional resistance offered by the valve or stream-controller in diverting said stream from the bucket. The consequence is a spreading or widening of the stream. To accommodate the relatively wide stream, the conduit of the discharge-chute is shown relatively wide and of a width exceeding the stream and the length of the stream-controller, by reason of which construction escape of the material at the sides is prevented after said stream leaves the stream-controller 70.

To regulate the closing movement of the closer, it is shown provided with a closer-regulator connecting-rod 560, which is shown connected to the crank-rod 561, (shown secured to the rock-shaft 600.) It is obvious that on the closing movement of the closer the closer-regulator rod, by reason of the connections just described, is enabled to maintain a parallel uniform relation to the bucket throughout its closing movement and sagging of the closer is prevented.

Having thus described my invention, I claim—

1. In an apparatus of the class specified, the combination with a weighing mechanism and its bucket, of a supply-chute for supplying a stream of material to the bucket; a discharge-chute; a stream-controller normally located above the supply-chute and the line of the supply-stream, to thereby normally permit the flow of the supply-stream under said controller into the bucket, and having also a stream-diverting movement from above, and substantially following, the line of flow of the stream for diverting the supply-stream to the discharge-chute; and stream-controller-actuating mechanism.

2. In an apparatus of the class specified, the combination with a weighing mechanism and its bucket, of a supply-chute for supplying a stream of material to the bucket; a discharge-chute; a stream-controller normally located above the supply-chute and the line of the supply-stream, to thereby normally permit the flow of the supply-stream under said controller into the bucket, said stream-controller having a curved edge portion, and operative also for diverting the supply-stream away from the bucket and to the discharge-chute, whereby during said stream-diverting movement, the curved edge portion of said stream-controller will gradually take control of the stream, and divert the same away from the bucket by a pressure upon one side thereof; and stream-controller-actuating mechanism.

3. In an apparatus of the class specified, the combination with a weighing mechanism and its bucket; of a supply-chute for supplying a stream of material to the bucket; a discharge-chute; a stream-controller having an opening in the edge thereof, and normally located above the supply-chute and above the line of the supply-stream, to thereby normally permit the supply-stream to flow into the bucket, and having a stream-diverting movement for diverting the supply-stream away from the bucket and to the discharge-chute; and means for retarding said stream-diverting movement of the stream-controller, to thereby permit a reduced stream to flow through said opening in the stream-controller and into the bucket, and for releasing said stream-controller; and stream-controller-actuating mechanism.

4. In an apparatus of the class specified, the combination with a weighing mechanism and its bucket, of a supply-chute for supplying a stream of material to the bucket; a discharge-chute; a double-stroke stream-controller supported for movement independently of the weighing mechanism and operative on one stroke to direct the stream to the bucket, and on the other stroke to divert the stream away from the bucket and to the discharge-chute; and stream-controller-actuating mechanism.

5. In a weighing apparatus, the combination with a weighing mechanism embodying a bucket; of a conveyer for maintaining a continuously-flowing stream of material; and a stream-controller having its axis of movement adjacent to the stream, and operable in the direction of and substantially with the stream, and having also a curved edge portion, whereby, it is adapted to gradually take control of the stream, and divert the same away from the bucket by a pressure upon one side thereof, substantially as specified.

6. In a weighing apparatus, the combination with a weighing mechanism embodying a bucket; of a conveyer adapted for maintaining a stream of material in the form of a circuit; a stream-controller supported independently of the weighing mechanism; and a stream-controller-actuating mechanism operable on the ascent of the bucket, for actuating said stream-controller to permit the stream to enter the bucket, and operable on the completion of a bucket-load, to actuate the stream-controller to divert the stream away from the bucket, substantially as specified.

7. In a weighing apparatus, the combination with a weighing mechanism embodying a bucket, and a beam or beams; of a conveyer adapted for maintaining a stream of material in the form of a circuit; a stream-controller supported independently of the weighing mechanism, and alternately operable to permit the stream to flow into the bucket, and to divert the stream away from the bucket; and an actuating-rod secured to said stream-controller, and in position and adapted to be engaged by a beam on the ascent of the bucket for actuating the stream-controller to cause the stream to enter the bucket, substantially as specified.

8. In a weighing apparatus, the combination with a bucket and its closer; of means for supplying a stream of material to said bucket; a rocker on the bucket, said rocker having a detent; a rod connecting said closer and rocker; a rocker-tripping latch having a detent coöperating with that of the rocker to hold the closer normally closed and a stream-controller in position and adapted for diverting the stream away from the bucket, said controller having an actuating-rod provided with a latch-actuating part; a stop on the rocker-tripping latch disposed in the path of said latch-actuating part, whereby, on the actuation of the tripping-latch stop by the latch-actuating part, the tripping-latch and rocker are disengaged, and the closer permitted to open, substantially as described.

9. In a weighing apparatus, the combination with a weighing mechanism embodying a bucket; and a conveyer for maintaining a stream of material in the form of a circuit; of a stream-controller operable for directing said stream to the bucket, and for diverting said stream away from the bucket on the completion of a bucket-load, and having a stop; and a detent carried by the weighing mechanism, and adapted to be engaged by said stop, on the descent of the bucket for holding said stream-controller in a position to permit the flow of a reduced stream, substantially as specified.

10. In a weighing apparatus, the combination with a weighing mechanism embodying a bucket; of a receptacle adapted for containing a supply of material to be supplied to said bucket; conductor apparatus communicating with said supply-receptacle, and adapted to supply a stream of material to the bucket, and embodying supply and discharge chutes; means for conveying material from the supply-receptacle to the conductor apparatus; and a stream-controller coöperating with the supply-chute of the conductor apparatus, and adapted on one stroke thereof to permit the stream to flow into the bucket, and on the other stroke to direct said stream to the discharge-chute of the conductor apparatus.

11. In a weighing apparatus, the combination with a weighing mechanism embodying a bucket; of a supply-chute in position and adapted for supplying a stream of material to the bucket; a discharge-chute located relatively adjacent to the bucket; and a stream-controller in position and adapted for controlling the stream, and having a drip-opening in the edge thereof, and adapted when the stream is diverted away from the bucket for permitting the flow of a reduced stream through said drip-opening in the stream-controller, substantially as specified.

FRANCIS H. RICHARDS.

Witnesses:
FRED. J. DOLE,
R. W. PITTMAN.